(12) United States Patent
Koeppel et al.

(10) Patent No.: US 11,915,223 B2
(45) Date of Patent: *Feb. 27, 2024

(54) SYSTEMS AND COMPUTER-IMPLEMENTED PROCESSES FOR PROVIDING ELECTRONIC NOTIFICATIONS

(71) Applicant: CAPITAL ONE SERVICES, LLC, Mclean, VA (US)

(72) Inventors: Adam R. Koeppel, Washington, DC (US); Alex Leo Niderberg, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 186 days.

This patent is subject to a terminal disclaimer.

(21) Appl. No.: 17/335,159

(22) Filed: Jun. 1, 2021

(65) Prior Publication Data

US 2021/0357904 A1    Nov. 18, 2021

Related U.S. Application Data

(63) Continuation of application No. 16/460,678, filed on Jul. 2, 2019, now Pat. No. 11,023,877, which is a continuation of application No. 14/682,053, filed on Apr. 8, 2015, now Pat. No. 10,387,865.

(60) Provisional application No. 61/977,379, filed on Apr. 9, 2014.

(51) Int. Cl.
*G06Q 20/32*     (2012.01)
*G06Q 40/02*     (2023.01)
*G07F 19/00*     (2006.01)

(52) U.S. Cl.
CPC ......... *G06Q 20/3221* (2013.01); *G06Q 40/02* (2013.01); *G07F 19/20* (2013.01); *G07F 19/206* (2013.01)

(58) Field of Classification Search
None
See application file for complete search history.

(56) References Cited

U.S. PATENT DOCUMENTS

| | | | |
|---|---|---|---|
| 8,751,316 B1 * | 6/2014 | Fletchall | G07G 1/0081 |
| | | | 705/16 |
| 8,831,642 B2 * | 9/2014 | Moldavsky | H04W 8/005 |
| | | | 455/414.3 |
| 9,386,416 B1 * | 7/2016 | Reyes | H04W 4/021 |
| 9,401,077 B2 | 7/2016 | Laracey | |

(Continued)

OTHER PUBLICATIONS

Dusto, Amy, "American Eagle and Macy's wake up shopper's app in stores", Digital commerce 360, Jan. 28, 2014, pp. 1-7. (Year: 2014).*

(Continued)

*Primary Examiner* — Mohammad Z Shaikh
(74) *Attorney, Agent, or Firm* — Perkins Coie LLP

(57) ABSTRACT

Systems and methods are disclosed for providing account balance notifications. The disclosed embodiments generally relate to using transmitters to activate a mobile application to request financial account information, such as an account balance, and display the requested information, via the mobile device, before the customer uses an automated teller machine (ATM) or conducts a transaction at a bank branch. In certain embodiments, the transmitters are low energy transmitters. Other aspects of the disclosed embodiments are described herein.

20 Claims, 5 Drawing Sheets

(56) References Cited

U.S. PATENT DOCUMENTS

| | | |
|---|---|---|
| 9,412,106 B2 | 8/2016 | Laracey |
| 9,430,781 B1 | 8/2016 | Kerr |
| 9,471,940 B2 | 10/2016 | Malone |
| 9,820,093 B2 | 11/2017 | Mayor |
| 9,824,545 B2 | 11/2017 | Smith et al. |
| 9,976,860 B2 | 5/2018 | Varoglu et al. |
| 10,154,372 B1 | 12/2018 | Vitavsky et al. |
| 10,275,827 B2 | 4/2019 | McCarthy et al. |
| 10,311,422 B2 | 6/2019 | Koeppel et al. |
| 10,387,865 B2* | 8/2019 | Koeppel ............ G06Q 40/02 |
| 11,023,877 B2* | 6/2021 | Koeppel ............ G07F 19/206 |
| 11,210,620 B2* | 12/2021 | Sakamoto ........ G06Q 30/0201 |
| 2002/0032746 A1 | 3/2002 | Lazaridis |
| 2002/0112014 A1 | 8/2002 | Bennett et al. |
| 2003/0163382 A1 | 8/2003 | Sharp |
| 2004/0019564 A1 | 1/2004 | Goldthwaite et al. |
| 2004/0025057 A1 | 2/2004 | Cook |
| 2004/0122771 A1 | 6/2004 | Celi, Jr. et al. |
| 2004/0124966 A1 | 7/2004 | Forrest |
| 2004/0204078 A1 | 10/2004 | Fare et al. |
| 2005/0250489 A1 | 11/2005 | Lazaridis |
| 2006/0068817 A1 | 3/2006 | Black et al. |
| 2007/0141988 A1* | 6/2007 | Kuehnel ............ H04W 8/005 358/1.15 |
| 2007/0203835 A1 | 8/2007 | Cai |
| 2008/0182591 A1 | 7/2008 | Krikorian |
| 2008/0245863 A1* | 10/2008 | Buchheit ............ G06Q 30/02 235/383 |
| 2009/0327135 A1* | 12/2009 | Nguyen ............ G06Q 40/02 705/44 |
| 2010/0005002 A1 | 1/2010 | Lazaridis |
| 2010/0063889 A1* | 3/2010 | Proctor, Jr. ............ H04W 4/21 705/26.1 |
| 2010/0121567 A1 | 5/2010 | Mendelson |
| 2010/0173585 A1 | 7/2010 | Button et al. |
| 2010/0202423 A1* | 8/2010 | Karaoguz ............ H04L 69/18 370/338 |
| 2011/0055084 A1 | 3/2011 | Singh |
| 2011/0137881 A1 | 6/2011 | Cheng et al. |
| 2011/0219230 A1 | 9/2011 | Oberheide et al. |
| 2011/0238573 A1 | 9/2011 | Varadarajan |
| 2011/0313924 A1 | 12/2011 | Carell et al. |
| 2012/0047070 A1 | 2/2012 | Pharris |
| 2012/0072350 A1 | 3/2012 | Goldthwaite et al. |
| 2012/0115512 A1 | 5/2012 | Grainger et al. |
| 2012/0143707 A1 | 6/2012 | Jain |
| 2012/0160912 A1 | 6/2012 | Laracey |
| 2012/0197797 A1 | 8/2012 | Grigg et al. |
| 2012/0197798 A1 | 8/2012 | Grigg et al. |
| 2012/0209685 A1* | 8/2012 | Nealer ............ G06Q 30/0207 705/14.36 |
| 2012/0235812 A1 | 9/2012 | Maia et al. |
| 2012/0239570 A1 | 9/2012 | Wolfs et al. |
| 2012/0271883 A1 | 10/2012 | Montoya et al. |
| 2012/0303448 A1 | 11/2012 | Psillas et al. |
| 2012/0316953 A1* | 12/2012 | Ramchandani ...... G06Q 20/352 705/14.58 |
| 2013/0006663 A1 | 1/2013 | Bertha et al. |
| 2013/0065584 A1* | 3/2013 | Lyon ............ H04W 4/80 455/434 |
| 2013/0124411 A1 | 5/2013 | Kobres et al. |
| 2013/0178233 A1 | 7/2013 | McCoy et al. |
| 2013/0205133 A1* | 8/2013 | Hess ............ H04L 63/0884 713/155 |
| 2013/0217332 A1* | 8/2013 | Altman ............ G06Q 20/3224 455/3.01 |
| 2013/0226704 A1 | 8/2013 | Fernandez |
| 2013/0282581 A1 | 10/2013 | Singh |
| 2013/0284806 A1 | 10/2013 | Margalit |
| 2013/0297422 A1* | 11/2013 | Hunter ............ H04H 60/63 705/14.58 |
| 2013/0310081 A1 | 11/2013 | Chu |
| 2013/0337748 A1 | 12/2013 | Reunamaki et al. |
| 2014/0007191 A1 | 1/2014 | Hu et al. |
| 2014/0081858 A1 | 3/2014 | Block et al. |
| 2014/0108108 A1* | 4/2014 | Artman ............ G06Q 20/322 705/14.1 |
| 2014/0188708 A1* | 7/2014 | Govindarajan ....... H04W 4/023 705/39 |
| 2014/0188733 A1* | 7/2014 | Granbery ............ G06Q 20/326 705/64 |
| 2014/0207575 A1* | 7/2014 | Freed-Finnegan ......................... G06Q 30/0641 705/14.58 |
| 2014/0220883 A1* | 8/2014 | Emigh ............ H04H 20/61 455/3.01 |
| 2014/0222574 A1* | 8/2014 | Emigh ............ G06Q 30/0261 455/3.06 |
| 2014/0278994 A1 | 9/2014 | Greenwood et al. |
| 2014/0279009 A1 | 9/2014 | Grigg et al. |
| 2014/0297009 A1 | 10/2014 | Bass et al. |
| 2014/0324527 A1 | 10/2014 | Kulkarni et al. |
| 2014/0324615 A1 | 10/2014 | Kulkarni et al. |
| 2014/0324725 A1 | 10/2014 | Edmonds et al. |
| 2014/0354418 A1 | 12/2014 | Leonard et al. |
| 2014/0365334 A1* | 12/2014 | Hurewitz ............ G06Q 30/0613 705/26.41 |
| 2014/0379472 A1 | 12/2014 | Rao et al. |
| 2014/0379480 A1 | 12/2014 | Rao et al. |
| 2015/0018011 A1 | 1/2015 | Mendelson |
| 2015/0039976 A1 | 2/2015 | Kern et al. |
| 2015/0070191 A1 | 3/2015 | Westick |
| 2015/0072618 A1* | 3/2015 | Granbery ............ G06Q 30/00 455/41.2 |
| 2015/0073980 A1* | 3/2015 | Griffin ............ H04L 63/0876 705/39 |
| 2015/0095161 A1 | 4/2015 | Goel |
| 2015/0095181 A1* | 4/2015 | Rice ............ G06Q 30/02 705/26.5 |
| 2015/0120504 A1* | 4/2015 | Todasco ............ G06Q 20/322 705/26.61 |
| 2015/0120541 A1 | 4/2015 | Johnson et al. |
| 2015/0120558 A1* | 4/2015 | Andrews ............ G07B 15/00 705/44 |
| 2015/0134374 A1* | 5/2015 | Schulz ............ G06Q 10/02 705/5 |
| 2015/0154634 A1 | 6/2015 | Chiu et al. |
| 2015/0154675 A1* | 6/2015 | Todasco ............ G06Q 30/0631 705/26.7 |
| 2015/0170131 A1* | 6/2015 | Patel ............ G06Q 20/326 705/44 |
| 2015/0170252 A1 | 6/2015 | Koo Tze Mew |
| 2015/0186872 A1 | 7/2015 | Sobol et al. |
| 2015/0189620 A1* | 7/2015 | Metral ............ H04W 4/02 709/206 |
| 2015/0213405 A1 | 7/2015 | Mondal et al. |
| 2015/0242764 A1* | 8/2015 | Subbaraj ............ H04L 67/56 705/5 |
| 2015/0248702 A1* | 9/2015 | Chatterton ......... G06Q 30/0261 705/14.58 |
| 2015/0278866 A1 | 10/2015 | Levi |
| 2015/0287014 A1* | 10/2015 | Granbery ............ H04W 4/029 705/44 |
| 2015/0289207 A1* | 10/2015 | Kubo ............ H04W 4/029 370/311 |
| 2015/0293356 A1 | 10/2015 | Grigg et al. |
| 2015/0294296 A1 | 10/2015 | Koeppel et al. |
| 2015/0294297 A1 | 10/2015 | Lipshultz |
| 2015/0294332 A1 | 10/2015 | Burns |
| 2016/0071115 A1 | 3/2016 | Oh et al. |
| 2016/0171486 A1 | 6/2016 | Wagner et al. |
| 2016/0232515 A1* | 8/2016 | Jhas ............ G06Q 20/3278 |
| 2017/0116612 A9 | 4/2017 | Naqvi |

OTHER PUBLICATIONS

Clancy, Heather, "Apple's iBeacon signals turning point for mobile arrangement", Fortune, Mar. 1, 2014, pp. 1-3. (Year: 2014).*

Swedberg, Claire, "Yes Bank Uses RFID to personalize service", RFID Journal, Oct. 31, 2008, pp. 1-2. (Year: 2008).

(56) References Cited

OTHER PUBLICATIONS

Paul, Ankita; Das Rohit; Sarkar, Abhik, "Mall Navigation Using WIFI Router", International Journal of Advanced Computer Research, vol. 2, No. 4, issue 6, Dec. 2012, pp. 1-5. (Year: 2012).
Silverman, Adam, "The Emergence of Beacons in Retail", Forrester, Mar. 12, 2014, pp. 1-15. (Year: 2014).
International Search Report and Written Opinion for International Application No. PCT/US2015/024990, dated Jul. 8, 2015 (11 pages).
M. Loncar, J. A. Aldan and M. Ivasic-Kos, "Mobile application for finding ATMs," 2015 38th International Convention on Information and Communication Technology, Electronics and Microelectronics (MIPRO), Opatija, 2015, pp. 1638-1642. (Year: 2015).

\* cited by examiner

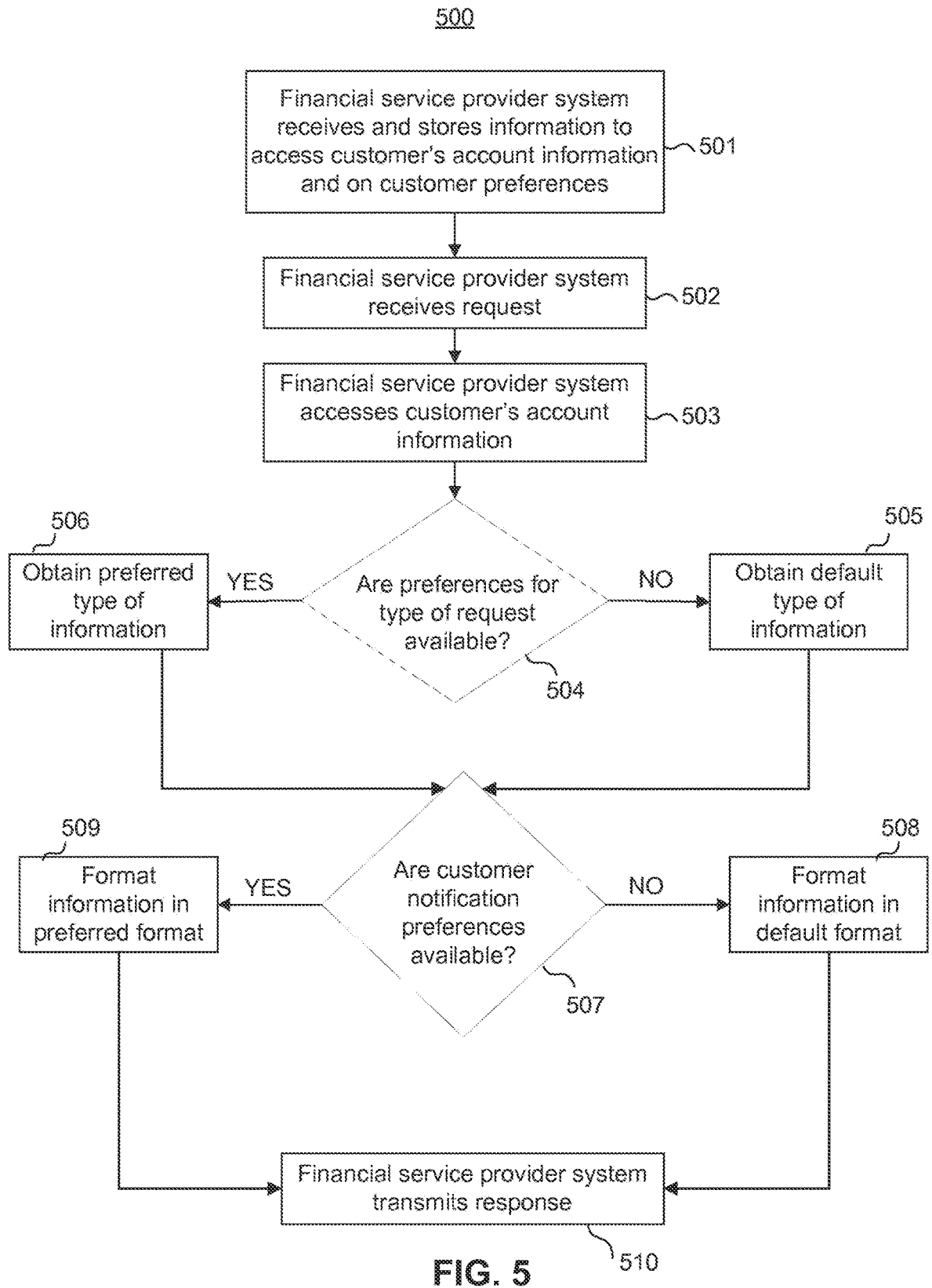

SYSTEMS AND COMPUTER-IMPLEMENTED PROCESSES FOR PROVIDING ELECTRONIC NOTIFICATIONS

PRIORITY CLAIM

This application is a continuation of U.S. patent application Ser. No. 16/460,678 (now U.S. Pat. No. 11,023,877), filed Jul. 2, 2019, which is a continuation of U.S. patent application Ser. No. 14/682,053 (now U.S. Pat. No. 10,387,865), filed Apr. 8, 2015, which claims priority from U.S. Provisional Application No. 61/977,379, filed Apr. 9, 2014. Each of the above-referenced applications is hereby incorporated by reference in its entirety.

TECHNICAL FIELD

The disclosed embodiments generally relate providing electronic notifications. In particular, disclosed embodiments may use low energy technology to activate a mobile application to check an account balance.

BACKGROUND

An automated teller machine (ATM) is an electronic device that allows banking customers to carry out financial transactions without the need for a human teller. For example, customers may use an ATM to access their bank accounts, deposit, withdraw, or transfer funds, check account balances, or dispense items of value. Generally, to use an ATM, the customer may insert a banking card containing magnetic strip information into the ATM's card reader, and authenticate the card by entering a personal identification number (PIN). After the card has been read and authenticated, the customer can carry out various transactions related to their account. Since the widespread adoption of ATMs, customer use of bank branches has declined. However, customers may still conduct similar activities (and often additional activities) at a bank branch with the assistance of a bank teller.

The most common activities that customers conduct at ATMs and bank branches are withdrawing funds from a financial account and checking an account balance. Before withdrawing funds, a customer might check his account balance to ensure that the intended withdrawal does not overdraw the account.

Currently, to obtain balance information, a customer using an ATM must use the check balance function of the ATM, wait for the ATM to transmit the request, and receive the desired information. Similarly, a customer at a bank branch must ask the teller to look up the customer's account balance and wait for the teller to request and relay the desired information. Furthermore, there are often substantial waiting lines at both ATMs and bank branches. Moreover, the time needed for customers to check their account balances before withdrawing funds increases the length of each transaction and exacerbates the delay.

Mobile devices (e.g., smartphones, tablets, etc.) are ubiquitous and these devices equipped with financial provider applications with balance checking functionality offer an alternative way for customers to check their account balances. However, current applications typically require the customer to request his account balance in a process involving unlocking his device, logging into an application, and requesting account information. Furthermore, if there is no line at the ATM or bank teller, or if the customer does not remember to use the application before approaching the ATM or bank teller, it is difficult for the customer to use the check balance functionality while interacting with the ATM or bank teller.

It is therefore desirable to provide systems and processes that more effectively provides the customer's account balance or other account notifications. It is also desirable for institutions to improve computer system performance by decreasing the time it takes to conduct a transaction by automatically providing account information.

SUMMARY

Disclosed embodiments include methods, systems, and non-transitory computer-readable storage media for enabling a customer to automatically receive account balance or other notifications such as safe spending limit information on a mobile device based on a customer's detected proximity to an ATM, bank teller station, or bank branch equipped with a wireless transmitter. Although other locating technologies, such as geofencing and GPS-based technologies or even user-provided check-ins, may also be used, transmitters can provide more accurate location information than other technologies and is not dependent on manually provided information. For example, one type of transmitter, low energy (LE) transmitters allow for micro-location of a mobile device that is a more precise predictor of a customer's location and presence at an ATM terminal or bank branch teller station. Additionally, LE transmitters may be used in locations where other locating technologies falter, such as inside buildings where GPS or cellular signals may not penetrate.

In some embodiments, a mobile device for providing account data is provided. The mobile device may comprise a display device, a memory storing instructions, and at least one processor configured to execute the instructions in the memory. The instructions in the memory may include instructions for detecting an identification signal, determining identification data based on the identification signal, and transmitting a request for account data based on the identification data. The instructions may further provide for receiving the requested account data and displaying the requested account data via the display device. In some embodiments the identification signal is transmitted from a low energy transmitter, and in some embodiments, the low energy transmitter is a Bluetooth™ LE transmitter. In some embodiments the requested account data is received as a push notification, a text message, or an e-mail, and in some embodiments, the account data is the account balance or a safe spend limit.

In some embodiments, a computer-implemented method for providing account data is provided. The method may comprise detecting, by at least one processor, an identification signal and determining, by the at least one processor, identification data based on the identification signal. The method may further comprise transmitting, by the at least one processor, a request for account data based on the identification data and receiving, by the at least one processor, the requested account data. The method may also comprise displaying, by the at least one processor, the requested account data via the display device. In some embodiments, the identification signal is transmitted from a low energy transmitter, and in some embodiments, the low energy transmitter is a Bluetooth™ LE transmitter.

In some embodiments, a non-transitory computer-readable medium storing instructions for providing account data is provided. In some embodiments, the instructions may be executable by at least one processor, and the instructions may provide for detecting an identification signal, determining identification data based on the identification signal, and transmitting a request for account data based on at least the identification data. The instructions may also provide for receiving the requested account data and displaying the requested account data via the display device. In some embodiments, the identification signal is transmitted from a low energy transmitter, and in some embodiments, the low energy transmitter is a Bluetooth™ LE transmitter.

It is to be understood that both the foregoing general description and the following detailed description are exemplary and explanatory only, and are not restrictive of the disclosed embodiments.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIG. 5 is a flowchart of exemplary process for receiving a request for account information at a financial service provider system and transmitting a response from a financial service provider system to a mobile device.

DESCRIPTION OF THE EMBODIMENTS

Reference will now be made in detail to exemplary embodiments, examples of which are illustrated in the accompanying drawings and disclosed herein. Wherever convenient, the same reference numbers will be used throughout the drawings to refer to the same or like parts.

Figure 1:
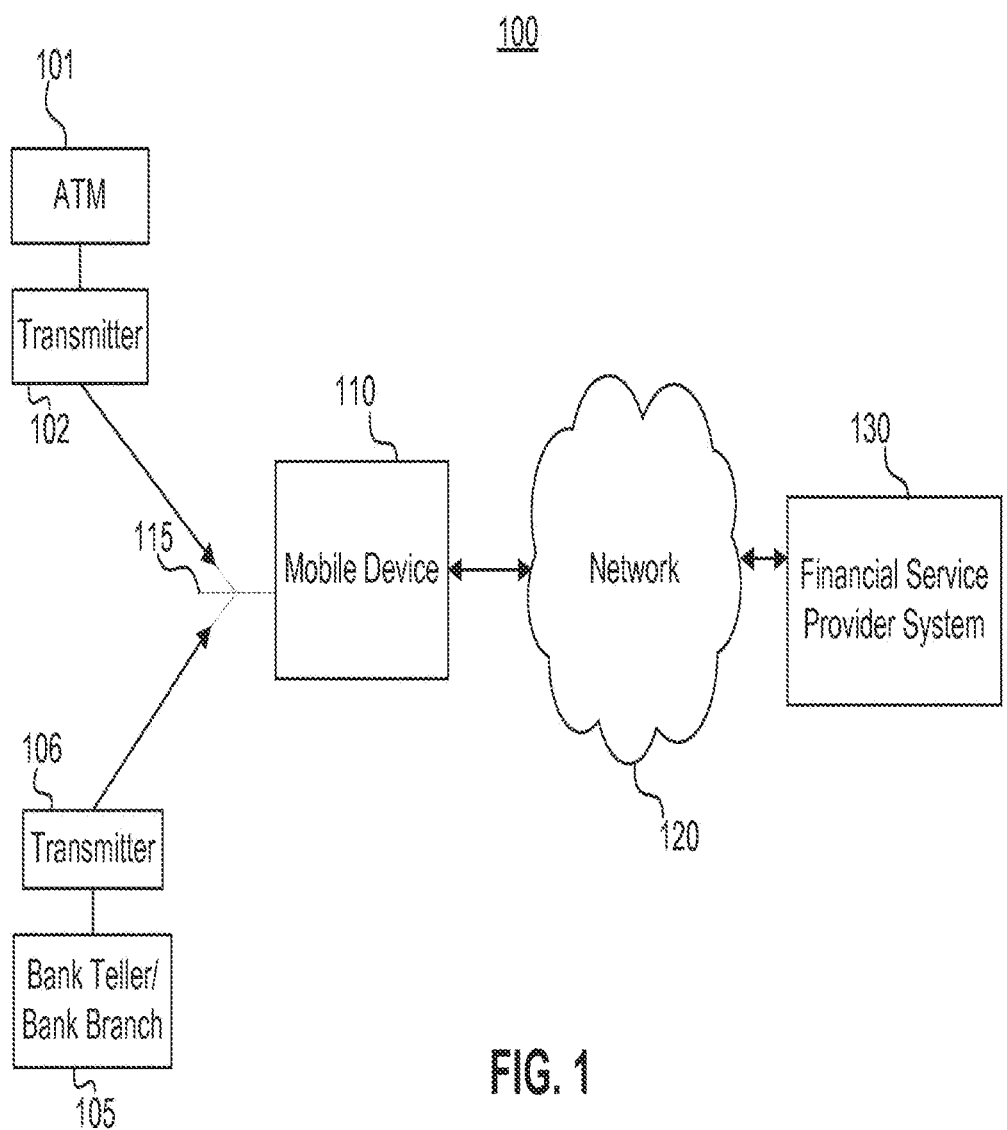
FIG. 1 is an exemplary system that may be used to implement the disclosed embodiments.

FIG. 1 is an exemplary system 100 configured to provide one or more aspects of the disclosed embodiments. The components and arrangements shown in FIG. 1 are not intended to be limiting to any disclosed embodiments, as the components used to implement the processes and features disclosed here may vary.

In accordance with certain disclosed embodiments, system 100 may include one or more ATMs 101 and one or more bank teller stations or bank branches 105 (hereinafter referred to as "bank branch 105" for ease of reference). ATM 101 and bank branch 105 may be provided by or operated on behalf of a financial service provider that provides financial service provider system 130 (e.g., ATM 101, bank branch 105, and financial service provider system 130 may be owned and/or operated by the same financial service provider). In certain embodiments, ATM 101 and bank branch 105 are not provided by the same financial service provider that provides financial service provider system, but ATM 101 and bank branch 105 are associated with the financial service provider that provides financial service provider system 130 such that a customer of the financial service provider is capable of accessing account information and/or conducting transactions via ATM 101 and bank branch 105 (e.g., financial service provider does not own ATM 101 or bank branch 105, but customers of the financial service provider can still access their accounts via ATM 101 and bank branch 105).

ATM 101 may be associated with transmitter 102 and bank branch 105 may be associated with a transmitter 106.

Each transmitter transmits an identification signal, and by reading the identification signal of the transmitter, the associated ATM 101 or bank branch 105 can be identified. Transmitter 102 may be located, for example, attached to the housing of the ATM, near the ATM (e.g., affixed to a door leading to the room with the ATM if the ATM is indoors), within the housing of the ATM, integrated into the hardware of the ATM, etc. Transmitter 106 may be located, for example, on the exterior of a bank branch (e.g., on an outside wall near the door of the bank branch, etc.) or within the bank branch (e.g., on an inside wall of the bank branch, at one or more bank teller stations, affixed to one or more bank teller computer terminals, within the housing of a bank teller computer terminal, integrated into the hardware of the bank teller computer terminal, etc.).

Transmitters 102 and 106 may be any device capable of transmitting an identification signal. In certain embodiments, transmitters 102 and 106 are low energy (LE) transmitters or ultra-low energy transmitters. In certain embodiments, transmitters 102 and 106 are LE transmitter devices configured to transmit Bluetooth™ LE signals. In certain embodiments, transmitters 102 and 106 transmit identification signals according to IBEACON™ protocols and standards. Some non-limiting examples of transmitters utilizing IBEACON™ include iBks101 beacons, AIRcable IBEACON™ dongles, devices configured with AIRcable BLE modules, BlueCats beacons, Bluebar beacons, devices configured with BlueGiga Bluetooth™ modules, Estimote beacons, GeLo beacons, GIMBAL™ beacons, Kontakt beacons, devices configured with Laird BL600 of DVK-BL600 iBeacon applications, devices configured with RADIUS NETWORKS™ IBEACON™ software, Sonic Notification beacons, etc.

The signal transmitted by transmitters 102 and 106 may include any identification signal that identifies the transmitter. Some non-limiting examples of identification signals used by Bluetooth™ LE transmitters include Proximity Universally Unique Identifier (UUID) information, Major identifier information, Minor identifier information, or combinations thereof. Although transmitters may generally use unique identification signals, in some embodiments, more than one transmitter may use the same identification information. For example, all ATMs and bank branches associated with the same financial institution may use transmitters that transmit the same identification information, allowing the ATMs and bank branches to be identified as associated with the financial institution but without distinguishing between the ATMs and bank branches.

Mobile device 110 is associated with a customer of the financial service provider that provides financial service provider system 130. The customer may have one or more accounts (e.g., checking or savings accounts) provided by the financial service provider. Mobile device 110 may be any device capable of receiving transmitter signals. Mobile device 110 may include smartphones, tablets, or other mobile devices. Mobile device 110 may use any appropriate operating system, such as iOS, Windows Phone, Android, or BlackBerry operating systems. In some embodiments, mobile device 110 may be capable of receiving Bluetooth™ LE signals, sometimes called Bluetooth SMART™ devices. Mobile device 110 may also be a device with a Bluetooth™

LE integrated circuit. Mobile device 110 may also be any other mobile device (e.g., Google Glass™) capable of receiving transmitter signals.

Mobile device 110 may be configured to transmit requests for customer account information to financial provider system 130, for example, via network 120. Mobile device 110 may also be configured to receive customer account information from financial provider system 130, for example, via network 120. Further details regarding mobile device 110 are provided in FIG. 2 and its description.

Network 120 may be any type of network that provides communications, exchanges information, and/or facilitates the exchange of information between mobile device 110 and financial service provider system 130. In one embodiment, network 120 may be the Internet, a Local Area Network, 3G telecommunications network, 4G telecommunications network, or other suitable connection(s) that enables bidirectional communication between various components of system 100.

Financial service provider system 130 may be associated with a financial account provider, such as, for example, a bank, lender, merchant, credit card provider, and any other entity that provides financial accounts to customers.

Financial service provider system 130 may be configured to receive requests for customer account information from mobile device 110, for example, via network 120. Financial service provider system 130 may also be configured to transmit customer account information to mobile device 110, for example, via network 120. Further details regarding financial service provider system 130 are provided with respect to FIG. 3.

Figure 2:
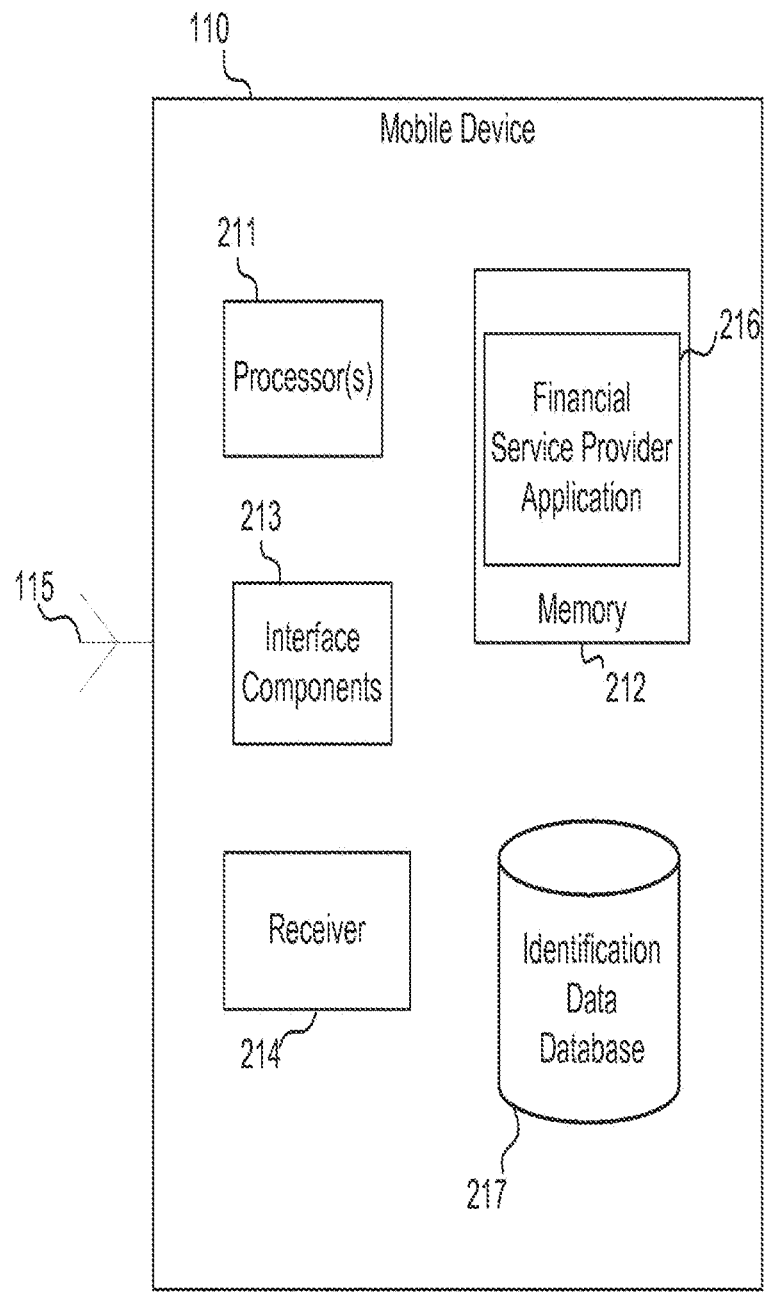
FIG. 2 is an exemplary mobile device configured to provide one or more aspects of the disclosed embodiments.

FIG. 2 is an exemplary mobile device 110, consistent with disclosed embodiments. In one embodiment, mobile device 110 may include one or more processor(s) 211, one or more memory devices, such as memory 212 and identification data database 217, interface components 213, receiver 214, and antenna 215.

Processor(s) 211 may be configured to execute instructions to provide processes and functionality as disclosed herein. Processor(s) 211 may be one or more known processing devices, such as a microprocessor from the Pentium™ family manufactured by Intel™ or the Turion™ family manufactured by AMD™. Processor(s) 211 may include a single core or multiple core processor system that provides the ability to perform parallel processes simultaneously. For example, processor(s) 211 may be a single core processor that is configured with virtual processing technologies known to those skilled in the art. In certain embodiments, processor(s) 211 may use logical processors to simultaneously execute and control multiple processes. Processor(s) 211 may implement virtual machine technologies, or other similar known technologies to provide the ability to execute, control, run, manipulate, store, etc. multiple software processes, applications, programs, etc. In another embodiment, processor(s) 211 may include a multiple-core processor arrangement (e.g., dual or quad core) that is configured to provide parallel processing functionalities to allow mobile device 110 to execute multiple processes simultaneously. One of ordinary skill in the art would understand that other types of processor arrangements could be implemented that provide for the capabilities disclosed herein.

Mobile device 110 may include one or more storage devices configured to store information used by processor(s) 211 (or other components) to perform certain functions related to the disclosed embodiments. In one example, mobile device 110 may include memory 212 that includes instructions to enable processor(s) 211 to execute one or more processes, such as mobile applications, network communication processes, and any other type of application or software known to be available on mobile device systems. In some embodiments, the instructions, mobile application programs, etc. may be stored in an external storage or available from a memory over a network (e.g., network 120). The one or more storage devices may be a volatile or non-volatile, magnetic, semiconductor, tape, optical, removable, nonremovable, or other type of storage device or tangible computer-readable medium.

In one embodiment, memory 212 may store instructions that, when executed by processor(s) 211, cause mobile device 110 to perform one or more processes consistent with the functionalities disclosed herein. Methods, systems, and articles of manufacture consistent with disclosed embodiments are not limited to separate programs or computers configured to perform dedicated tasks. For example, mobile device 110 may include a memory that may include one or more programs to perform one or more functions of interface components 213 and receiver 214. Moreover, processor(s) 211 may execute one or more programs located remotely from mobile device 110. For example, mobile device 110 may access one or more remote programs, that, when executed, perform functions related to disclosed embodiments. Memory 212 may include or be associated with one or more memory devices that store data and instructions used to perform one or more features of the disclosed embodiments, and memory 212 may also include any combination of one or more databases controlled by memory controller devices (e.g., server(s), etc.) or software, such as document management systems, Microsoft SQL databases, SharePoint databases, Oracle™ databases, Sybase™ databases, or other relational databases (see, e.g., identification data database 217, described below). Mobile device 110 may also be communicatively connected to one or more memory devices (e.g., other databases not shown) locally or through a network. The remote memory devices may be configured to store information and may be accessed and/or managed by mobile device 110. By way of example, the remote memory devices may be document management systems, Microsoft SQL databases, SharePoint databases, Oracle™ databases, Sybase™ databases, or other relational databases. Systems and methods of disclosed embodiments, however, are not limited to separate databases or even to the use of a database.

Mobile device 110 may include identification data database 217, which may include identification information for identifying transmitters associated with ATMs and/or bank branches associated with financial service provider system 130. For example, identification data database 217 may include one or more tables that link each unique identification information to its respective transmitter, the location (e.g., address) of the transmitter, and the ATM or bank branch with which it is associated. Identification data database 217 may be controlled by a memory controller device or software, such as document management systems, Microsoft SQL databases, SharePoint databases, Oracle™ databases, Sybase™ databases, or other relational databases. In some embodiments, identification data database 217 may be a remote memory device that may be accessed and/or managed by mobile device 110.

Mobile device 110 may also include one or more I/O devices that may comprise one or more interfaces for receiving signals or input from input devices and providing signals or output to one or more output devices that allow data to be received and/or transmitted by mobile device 110.

For example, mobile device 110 may include interface components 213 that may provide interfaces to one or more input devices such as one or more display screens, on-screen keyboards, fingerprint recognition devices, and the like, that enable mobile device 110 to receive data from the customer and provide notifications to the customer. Further, interface components 213 may include components configured to send and receive information between components of system 100, such as between mobile device 110, transmitters 102 and 106, and financial service provider system 130, for example, via network 120.

Mobile device 110 may also include antenna 215. Antenna 115 may be any type of known antenna capable of detecting transmitter signals. For example, antenna 215 may be any type of commercially available antenna. In certain embodiments, antenna 215 may be an LE antenna. In certain embodiments, antenna 215 may be a Bluetooth™ LE antenna. In some embodiments, antenna 215 may be integrated with receiver 214 and/or with other components of mobile device 110.

Mobile device 110 may also include receiver 214. Receiver 214 may be any type of receiver that can receive one or more frequencies of transmitted signals (e.g., from antenna 215), and may be configured in hardware, software and/or some combination of hardware and software. Receiver 214 may also convert the received signals into digital data, and send the digital data to other components of mobile device 110. Receiver 214 may also transmit the identification data using any known transmission method such as, for example, using one or more data packets. In some configurations, receiver 214 may be capable of simultaneously listening for a plurality of differently modulated signals at once. In certain embodiments, receiver 214 may be an LE receiver. In certain embodiments, receiver 214 may be a Bluetooth™ LE antenna. In some embodiments, receiver 214 may be integrated with antenna 115 and/or other components of mobile device 110.

In certain embodiments, memory 212 may include software components that, when executed by processor(s) 211, perform one or more processes consistent with the disclosed embodiments. For example, memory 212 may include financial service provider application 216, which may include software instructions executable by one or more processors, such as processor(s) 211. When executed, the software instructions for financial service provider application 216 may provide features relating to receiving identification data (e.g., from receiver 214) and/or notification that identification data for an ATM and/or bank branch associated with financial provider system 130 has been received (e.g., from the operating system of mobile device 110), optionally confirming identification data is associated with a transmitting device associated with financial service provider system 130, transmitting a request for the customer's account balance, safe spending limit, or other account data to financial service provider system 130 (e.g., via network 120), receiving requested account data from financial service provider system 130 (e.g., via network 120), and receiving a push notification for display on mobile device 110 (e.g., from financial service provider system 130).

In some embodiments, financial service provider application 216 may be running (either actively being used by the customer or passively running in the background) when mobile device 110 is on and transmitter signals are received. In some embodiments, financial service provider application 216 may receive the transmitter identification data and check whether the identification data matches identification data for ATMs and/or bank branches associated with financial service provider 130 (e.g., in identification data database 217). In some embodiments, financial service provider application 216 may not be running when mobile device 110 is on and transmitter identification signals are received. In such cases, the operating system of mobile device 110 may be configured to receive and check transmitter identification data (translated and/or determined from the identification signals by receiver 214 or detected based on the received identification signals) against identification data database 217, start financial service provider application 216 when the identification data matches identification information for ATMs and/or bank branches associated with financial service provider system 130, and transmit the matched identification data or notification that a match has been found to financial service provider application 216 for subsequent processing. In some embodiments, even when financial service provider application 216 is running, transmitter identification data may first be processed and matched by the operating system before the identification data (or notification of match identification data) is transmitted to financial service provider application 216 for subsequent processing.

Financial service provider app 216 may further be configured to transmit a request to financial service provider system 130 for the customer's account data after matched identification data is found (e.g., after received identification data is matched to identification information in identification data database 217 associated with financial service provider system 130). The request may be an encrypted application programming interface (API) request transmitted via network 120. The request may include one or more of the identifier for mobile device 110, customer information (e.g., customer name, account number, etc.), identification data, customer notification preferences, and/or the type of request (e.g., requesting account balance information, safe spending limit information, other account information, or any combination thereof). The request may also include information such as the location of the customer, location of the ATM/bank branch associated with the transmitter identification data, or other information that may be used by the financial service provider for purposes other than providing account data to the customer. For example, the request may include information that allows the financial service provider to better understand the travel habits of its customers. One of ordinary skill in the art would understand information desirable to include in a request.

Customer notification preferences may include information entered by the customer and stored by financial service provider application 216 regarding the customers preferred method of notification for received account information. For example, financial service provider system 130 may be configured to transmit the requested account information as a push notification, a text, an e-mail, or other type of notification that can be received and displayed to the customer via mobile device 110, and the customer may pre-select the form in which the financial service provider system 130 will transmit the requested information. If the customer does not pre-select a notification method, financial service provider system 130 may be configured to send the notification via a default method (e.g., all notifications would be push notifications unless another method were selected by the customer). In certain embodiments, notification options may not be available, and financial service provider system may be configured to transmit the notification via one method. In certain embodiments, financial service provider system 130 may transmit the requested account data to financial service provider application 216, and financial service provider application transmits the information via the method selected by the customer or via a default method. One of ordinary skill in the art would understand desirable configurations for the notification for account information and parameters desirable for a customer to configure.

The customer may also be able to set preferences for the type of request transmitted by financial service provider application 216. For example, financial service provider application 216 may be configured to allow the customer to choose what type of information (e.g., account balance information, safe spending limit information, etc.) should be requested when identification data is matched. For a request for the safe spending limit, financial service provider application 216 may be configured for a default safe spending limit, or it may be configured to allow the customer to set a safe spending limit amount. For example, the default safe spending limit amount may be the account balance minus any pending transactions, and a customer may be able to set the safe spending limit amount may be the account balance minus $1,000. One of ordinary skill in the art would understand desirable configurations for the types of request that may be sent by financial service provider application 116 and parameters desirable for a customer to configure.

Figure 3:
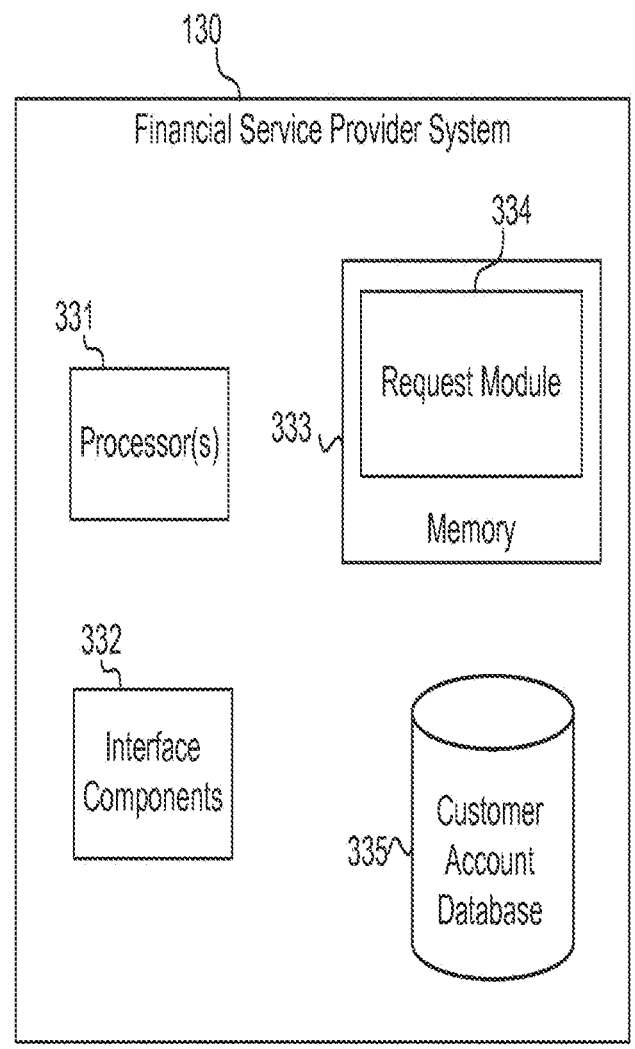
FIG. 3 is an exemplary financial service provider system configured to provide one or more aspects of the disclosed embodiments.

FIG. 3 is an exemplary financial service provider system 130, consistent with disclosed embodiments. Financial service provider system 130 may include processor(s) 331. Processor(s) 331 may be one or more known processing devices, such as a microprocessor from the Pentium™ family manufactured by Intel™ or the Turion™ family manufactured by AMD™. Processor(s) 331 may include a single core or multiple core processor system that provides the ability to perform parallel processes simultaneously. For example, processor(s) 331 may be a single core processor that is configured with virtual processing technologies known to those skilled in the art. In certain embodiments, processor(s) 331 may use logical processors to simultaneously execute and control multiple processes. Processor(s) 331 may implement virtual machine technologies, or other similar known technologies to provide the ability to execute, control, run, manipulate, store, etc. multiple software processes, applications, programs, etc. In another embodiment, processor(s) 331 may include a multiple-core processor arrangement (e.g., dual or quad core) that is configured to provide parallel processing functionalities to allow financial service provider system 130 to execute multiple processes simultaneously. One of ordinary skill in the art would understand that other types of processor arrangements could be implemented that provide for the capabilities disclosed herein.

Financial service provider system 130 may also include one or more I/O devices that may comprise one or more interfaces for receiving signals or input from input devices and providing signals or output to one or more output devices that allow data to be received and/or transmitted by financial service provider system 130. For example, financial service provider system 130 may include interface components 332 that may include components configured to send and receive information between components of financial service provider system 130 and mobile device 110, via networks such as network 120.

Financial service provider system 130 may include one or more storage devices configured to store information used by processor(s) 331 (or other components) to perform certain functions related to the disclosed embodiments. In one example, financial service provider system 130 may include a memory 333 that includes instructions to enable processor(s) 331 to execute one or more applications, such as server applications, network communication processes, and any other type of application or software known to be available on computer systems. In some embodiments, the instructions, application programs, etc. may be stored in an external storage or available from a memory over a network. The one or more storage devices may be a volatile or non-volatile, magnetic, semiconductor, tape, optical, removable, nonremovable, or other type of storage device or tangible computer-readable medium.

In one embodiment, financial service provider system 130 includes a memory 333 that includes instructions that, when executed by processor(s) 331, perform one or more processes consistent with the functionalities disclosed herein. Methods, systems, and articles of manufacture consistent with disclosed embodiments are not limited to separate programs or computers configured to perform dedicated tasks. For example, financial service provider system 130 may include a memory that may include one or more programs to perform one or more functions of interface components 332. Moreover, processor(s) 331 may execute one or more programs located remotely from financial service provider system 130. For example, financial service provider system 130 may access one or more remote programs, that, when executed, perform functions related to disclosed embodiments. Memory 333 may include one or more memory devices that store data and instructions used to perform one or more features of the disclosed embodiments. Memory 333 may also include any combination of one or more databases controlled by memory controller devices (e.g., server(s), etc.) or software, such as document management systems, Microsoft SQL databases, SharePoint databases, Oracle™ databases, Sybase™ databases, or other relational databases (see, e.g., customer account database 335, described below). Financial service provider system 130 may also be communicatively connected to one or more memory devices locally or through a network. The remote memory devices may be configured to store information and may be accessed and/or managed by financial service provider system 130. By way of example, the remote memory devices may be document management systems, Microsoft SQL database. SharePoint databases, Oracle™ databases, Sybase™ databases, or other relational databases. Systems and methods of disclosed embodiments, however, are not limited to separate databases or even to the use of a database.

Financial service provider system 130 may include customer account database 335. In certain embodiments, customer account database 335 may be configured to store information about customers' financial accounts such as account balances. In some embodiments, customer account database 335 may be configured to store information about the customer's preferences, such as the customer's notification preferences.

In certain embodiments, memory 333 may include software components that, when executed by processor(s) 331, perform one or more processes consistent with the disclosed embodiments. For example, memory 333 may include request module 334, which may include software instructions executable by one or more processors, such as processor(s) 331. When executed, the software instructions for request module 334 may provide features related to receiving a request for account information (e.g., from financial service provider application 216 via network 120), retrieving requested information (e.g., from customer account database 335), calculating requested information (e.g., calculating a safe spend limit), and/or transmitting the requested information (e.g., to mobile device 110 via network 120). Request module 334 may be stored in one or more memory devices remote from financial service provider system 130 and retrieved or executed remotely, with results of the execution being provided to financial service provider system 130 for subsequent processing.

As noted above, request module 334 of financial service provider system 130 may provide information responsive to the request from financial service provider application 216 in various formats (e.g., as a push notification, as a text message, as an e-mail, or in any format that can be received and displayed via mobile device 110). Financial service provider system 130 (e.g., request module 334) may be configured to provide the information via one or more default methods (e.g., send all responses via text message, or attempt to send information as a text message first, then follow with an e-mail if the text message is undeliverable). Financial service provider system 130 may also be configured to receive information on a customer's preferred notification method and to send account information using the customer's preferred method. In some embodiments, the customer's preferences may be stored by financial service provider system 130 (e.g., in customer account database 335). For example, when the customer first installs financial service provider application 216 on mobile device 110, the customer may be asked to set his preferences, including notification preferences, and these preferences may be transmitted to financial service provider system 130 and stored (e.g., in customer account database 335) for use when a customer is near transmitters 102 or 106. In some embodiments, the customers preferences may be transmitted with the request, and request module 334 may be configured to receive the preferences and generate the response in the appropriate format. In some embodiments, request module 334 transmits the response to financial service provider application 216, and financial service provider application 216 transmits the response for display on mobile device 110.

Figure 4:
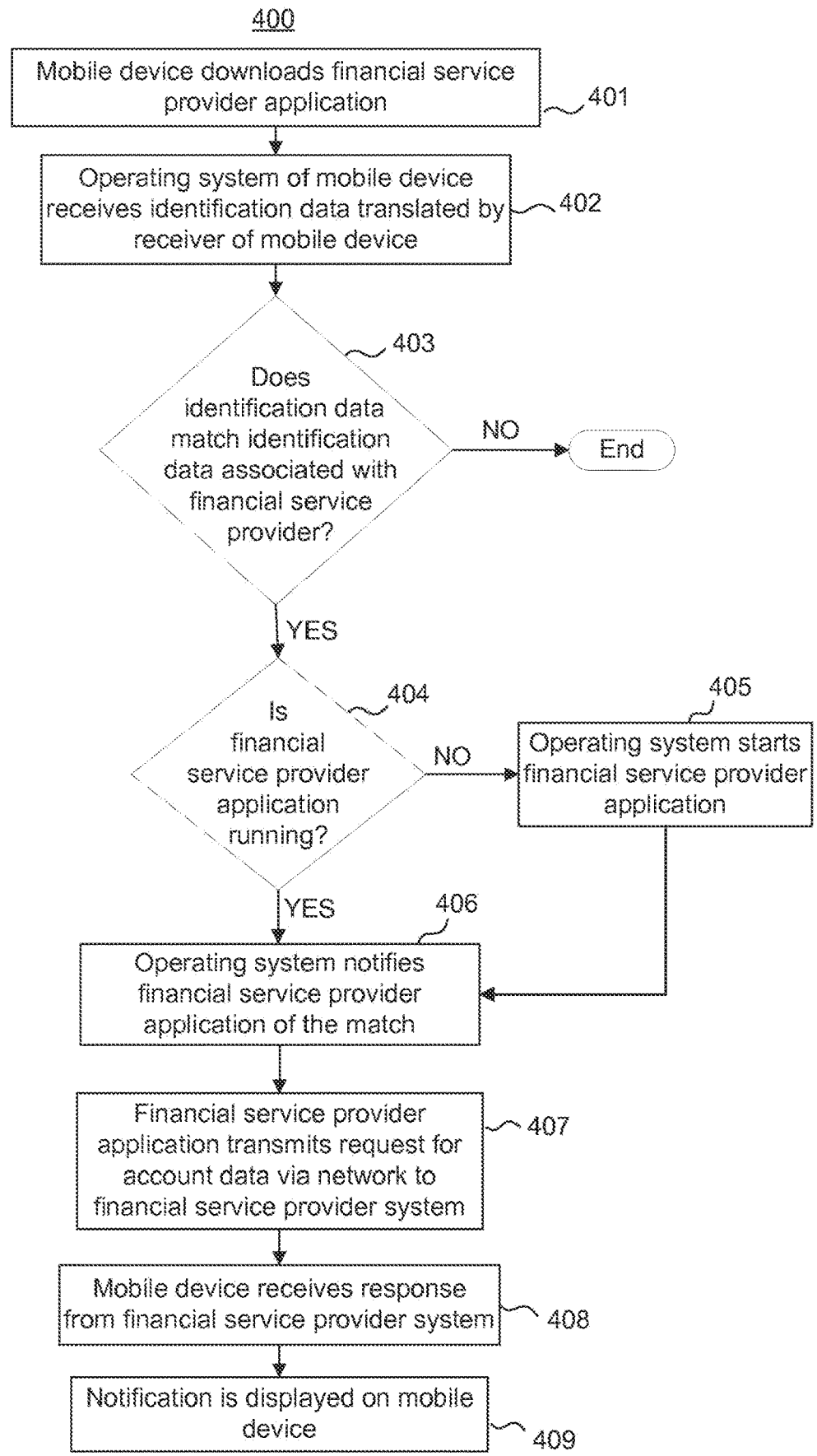
FIG. 4 is a flowchart of an exemplary process for automatically requesting and receiving account information via a mobile device.

FIG. 4 is a flowchart of an exemplary process 400 for automatically requesting and receiving account information via a mobile device.

At step 401, mobile device 110 may download financial service provider application 216. For example, the customer may access an application store, select financial service provider application 216, and download financial service provider application 216 onto mobile device 110. As would be readily apparent to one of ordinary skill in the art, the automatic provision of account data as disclosed herein may be one set of functions within several sets of functions provided by financial service provider application 216. Upon downloading financial service provider application 216 or before the first automatic request for account information, the customer may be invited to enter customer information (e.g., customer name, account number, etc.). The customer information, which may be used to link the device to the customer's financial account. For example, upon receipt of the customers information, financial service provider application 216 may be configured to transmit an identifier for mobile device 110 with the customer information to financial service provider system 130, and the identifier may be linked to and stored with the customer's account information so that future requests from the same device will be automatically associated with the customer's account. In some embodiments, the customer information may be stored by financial service provider application 216 of mobile device 110 for later transmission with account information requests.

After downloading financial service provider application 216 or before the first automatic request for account information, the customer may be invited to enter customer preferences, such as the customer's preferred type of request and the customer's preferred type of notification. Information on these preferences may be transmitted to financial service provider system 130 (e.g., stored with the customer's account information in customer account database 335, so that responses are of the type and via the notification method preferred by the user) and/or may be stored by financial service provider application 216 on mobile device 110 for later transmission with requests.

When mobile device 110 comes in close enough proximity to ATM 101 and/or bank branch 105 with transmitters 102 and/or 106, respectively, antenna 115 may receive or detect the identification signals transmitted by transmitter 102 and/or 106. Receiver 214 may translate the signal into digital data for processing by the operating system of mobile device 110. In some embodiments, receiver 214 may detect digital data included within the signal. After receiving the identification data from receiver 214 (step 402), the operating system may compare the digital identification data to identification data database 217 (step 403). If there is no match ("no" in step 403), the process may end. If there is a match ("yes" in step 403), the operating system checks if the financial service provider application 216 is already running (step 404). If financial service provider application 216 is not already running ("no" in step 404), the operating starts financial service provider application 216 (step 405). The operating system may then notify financial service provider application 216 of the match (step 406), for example, by transmitting an indication that a match was found or by transmitting the identification data to financial service provider 216. If financial service provider application 216 is already running ("yes" in step 404), process 400 may proceed to step 406, where the operating system may notify financial service provider application 216 of the match.

As discussed above with respect to FIG. 2, in some embodiments, financial service provider application 216 may be running in the background and may directly receive the digital identification data from receiver 214. In such cases, financial service provider application 216 may compare the received identification data to the identification data database 217 to determine if there is a match. In some embodiments, the operating system may receive identification data from receiver 214, start financial service provider application 216 (if not already running), and transmit the identification data to financial service provider application 216 without first comparing the identification data to the identification data database 217 (wherein financial service provider application 216 would then conduct the comparison). One of ordinary skill in the art would understand desirable configurations for determining that the identification data matched identification information associated with financial provider system 130 and beginning the process of requesting account information via financial service provider application 216.

At step 407, financial service provider application 216 may transmit a request for account data to financial service provider system 130, e.g., via network 120. The request may be an encrypted application programming interface (API) request. The request may include one or more of the identifier of mobile device 110, customer information (e.g., customer name, account number, etc.), identification data, customer notification preferences, and/or the type of request (e.g., a request for account balance information, safe spending limit information, other account information, or any combination thereof).

The request may include information sufficient for financial service provider system to find the requested account information. For example, if mobile device 110 is already linked to the customer's information at financial service provider system 130 (e.g., in customer account database 335) such that any request from mobile device 110 would be associated with the customer's account information, the request may include the identifier of mobile device 110 without additional customer information. In some embodiments, if customer information was stored on mobile device 110 by financial service provider application 216, one or more pieces of customer information may be transmitted with the request. In some embodiments, the matched identification data is transmitted in the request.

In some embodiments, customer notification preferences may be transmitted with the request, for example, if such preferences had not previously been transmitted to or stored by financial service provider system 130. In some embodiments, customer notification preferences may not be transmitted, for example, if only default notifications are available (e.g., the customer cannot select options), if the customer has not yet provided notification preferences, or if financial service provider system 130 transmits the response to financial service provider application 216 and financial service provider application 216 ultimately transmits the notification for display on mobile device 110.

In some embodiments, information on the type of account data requested is transmitted. In some embodiments, this information may be transmitted as customer preferences for financial service provider system 130 to process (e.g., a general request for account information is transmitted along with a list of the customer's preferences, and financial service provider system 130 combines the two to obtain the customer's preferred type of information). In some embodiments, the customer preferences on the type of account data to request is processed by financial service provider application 216 and dictates the type of request sent to financial service provider system 130 (e.g., financial service provider application 216 requests only account balance account information). In some embodiments, information on the type of account data requested is not transmitted, for example, if the system is configured to transmit default account data or if the customer has not set up preferences for the type of account data to request.

The request may also include information such as the location of the customer, location of the ATM/bank branch associated with the identification data. The request may include other information that may be used by the financial service provider for purposes other than providing account data to the customer. For example, the request may include information that allows the financial service provider to better understand the travel habits of its customers. One of ordinary skill in the art would understand information desirable to include in a request.

At step 408, mobile device 110 may receive the response from financial service provider system 130, for example, via network 120 and interface components 232. The response may be identical to the account data retrieved by financial service provider system 130 (e.g., the customer's account balance) or it may be derived from the account data retrieved (e.g., the customer's safe spending limit derived from the customer's current account balance). The response may be in the form of a push notification, a text message, an e-mail, or any form that may be received by mobile device 110 and displayed for the customer review. The form of the notification may be set, for example, by customer preferences that are previously received and stored by financial service provider system 130, by customer preferences transmitted in the request, or by default settings. The response may be in a form that allows notification to be displayed (step 409) without being handled by financial service provider application 216 (e.g., text message, e-mail). The response may be in a form that can be received by financial service provider application 216, wherein financial service provider application 216 may translate the response into a notification for step 409 (e.g., a push notification).

FIG. 5 is a flowchart of exemplary process 500 for receiving a request for account information at a financial service provider system and transmitting a response from a financial service provider system to a mobile device.

At step 501, financial service provider system 130 may receive and store information for accessing a customer's account information and on the customer's preferences. For example, financial service provider system 130 may receive an identifier for mobile device 110 that may be linked to and stored with the customer's account information so that future requests from the same device will be automatically associated with the customer's account. As another example, financial service provider system 130 may receive account access information such as the customer's name, account number, password, PIN, an identifier of financial service application 116, etc., which may be received with or without an identifier for mobile device 110. Financial service provider system 130 may also receive customer preferences for one or more of the type of information requested (e.g., account balance information, safe spending limit information), how to derive requested information (e.g., customer's preferred calculation for safe spending limit), notification format (e.g., push notification, text message, etc.), etc.

The information may be received and stored by financial service provider system 130 before the first request for account information is received from financial service provider application 216. For example, after downloading financial service provider application 216, the customer may be invited to enter customer preferences, and the information on these preferences may be transmitted to financial service provider system 130. In certain embodiments, the receipt of the information is optional (e.g., the customer may not be required to transmit information or financial service provider system 130 may not be configured to receive such information in advance of a request).

At step 502, financial service provider system 130 (e.g., request module 334) receives the request, for example, via network 120 and interface components 332. Based on the information provided in the request (e.g., the identifier for mobile device 110 and/or customer information), request module 334 may access the customer's account information, for example, in customer account database 335 (step 503). In certain embodiments, request module 334 may determine if a preferred type of information has been specified by retrieving previously stored customer preference information and/or reviewing the preferences transmitted with the request (e.g., decision 504). In certain embodiments, decision 504 may be omitted, for example, if financial service provider system 130 is not configured to provide various types of account information and is instead configured to provide default information (e.g., configured to go from step 503 to step 505). At decision 504, if request preferences are available ("yes" in step 504), financial service provider system 130 may be configured to obtain the preferred type of account information (e.g., step 506), for example, by retrieving the preferred information from customer account database 335 (e.g., account balance information) or by deriving the preferred information from data stored in customer account database 335 (e.g., deriving safe spend information from account balance information). In certain embodiments, financial service provider system 130 may be configured to recognize a hierarchy in request preferences. For example, financial service provider system 130 may be configured to first check any information type preferences transmitted with the request and follow those instructions if available, but if those instructions are not available, financial service provider system 130 may then check for any information type preferences stored in customer account database 335.

If request preferences are not available ("no" in step 504), financial service provider system 130 may be configured to obtain the default type of account information (e.g., step 505), for example, by retrieving the default information from customer account database 335 (e.g., account balance information) or by deriving the default information from data stored in customer account database 335 (e.g., deriving safe spend information from account balance information).

After obtaining the account information, financial service provider system 130 may be configured to determine if a preferred format for the response has been specified by retrieving previously stored customer notification preferences and/or reviewing the notification preferences transmitted with the request (e.g., step 507). In certain embodiments, step 507 may be omitted, for example, if financial service provider system 130 is not be configured to provide various formats for the response and is instead be configured to provide a default response (e.g., configured to go from step 505 or 506 directly to step 508). At step 509, if response format preferences are available ("yes" in step 507), financial service provider system 130 may be configured to format the obtained information into the preferred response format. In certain embodiments, financial service provider system 130 may be configured to recognize a hierarchy in response format preferences. For example, financial service provider system 130 may be configured to first check any format preferences transmitted with the request and follow those instructions if available, but if those instructions are not available, financial service provider system 130 may then check for any format preferences stored in customer account database 335.

If response format preferences are not available ("no" in step 507), financial service provider may be configured to format the obtained information in a default format (e.g., step 508). For example, the default format may be to send the response as a push notification. As another example, if financial service provider application 216 is configured to format the information for display, financial service provider system 130 may not be configured to format the response for display and may only format it (if any additional formatting is needed) for receipt by financial service provider application 216.

At step 510, financial service provider system may be configured to transmit the response to mobile device 110 (e.g., to financial service provider application 216). In certain embodiments, financial service provider system 130 may also be configured to reformat the response in a second format if financial service provider system 130 receives information that there was an error in the transmission or receipt of the response formatted in the first format. For example, if the response was first sent as an e-mail, but financial service provider system 130 receives a notice that the e-mail could not be delivered, or "bounced back," financial service provider system 130 may be configured to reformat the response as a text message and transmit the text message. One of ordinary skill in the art would understand advantageous configurations for the transmission and re-transmission of responses.

Other features and functionalities of the described embodiments are possible. For example, the processes shown in FIGS. 4 and 5 and described above are not limited to the sequences described above. Variations of these sequences, such as the removal and/or the addition of other process steps may be implemented without departing from the spirit and scope of the disclosed embodiments.

Additionally, any financial service provider may employ systems, methods, and articles of manufacture consistent with certain principles related to the disclosed embodiments. In addition, any merchant may also employ systems, methods, and articles of manufacture consistent with certain disclosed embodiments.

Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead are defined by the appended claims in light of their full scope of equivalents.

What is claimed is:

1. An apparatus for activating an application, comprising:
   a short-range wireless receiver configured to receive, from a low energy wireless transmitter, an identification signal; and
   memory storing instructions, and one or more processors configured to execute the instructions to:
      execute a transmitter identification check program on the apparatus while an application associated with a financial entity is not executing on the apparatus;
      while the application associated with the financial entity is not executing on the apparatus, determine, via the transmitter identification check program, based on the received identification signal, that the low energy wireless transmitter is associated with the financial entity;
      in response to the determination that the low energy wireless transmitter is associated with the financial entity, cause the application associated with the financial entity to (i) start executing on the apparatus and (ii) transmit, to a server system associated with the financial entity, a request for account data relating to a user account associated with the financial entity;
      receive, from the server system in response to the request, the requested account data; and
      cause a display of the apparatus to present the requested account data.

2. The apparatus of claim 1, wherein the identification signal comprises at least one of a proximity universally unique identifier, a major identifier, or a minor identifier.

3. The apparatus of claim 1, wherein the low energy wireless transmitter comprises an ultra-low energy wireless transmitter.

4. The apparatus of claim 1, wherein the low energy wireless transmitter is a Bluetooth™ LE transmitter.

5. The apparatus of claim 1, wherein the identification signal is transmitted according to an IBEACON protocol.

6. The apparatus of claim 1, wherein the request comprises at least one of: location information of the apparatus or location information of the low energy wireless transmitter.

7. The apparatus of claim 1, wherein the requested data received from the server system comprises account data of a user associated with the apparatus.

8. The apparatus of claim 7, wherein the account data comprises at least one of an account balance or a safe spend limit.

9. The apparatus of claim 1, wherein determining that the low energy wireless transmitter is associated with the financial entity comprises:
  accessing an identification data database comprising information identifying a plurality of wireless transmitters; and
  determining, based on the information identifying the low energy wireless transmitter and the information identifying the plurality of wireless transmitters, that the low energy wireless transmitter is associated with the financial entity.

10. The apparatus of claim 9, further comprising a storage device configured to store the identification data database.

11. The apparatus of claim 9, wherein the identification data database is stored in a storage device remote from the apparatus.

12. One or more non-transitory computer-readable media storing instructions that, when executed by one or more processors of a user device, cause operations comprising:
  receiving, via a low energy wireless transmitter, an identification signal;
  determining, via an identification check program executing on the user device, based on the received identification signal, information identifying the low energy wireless transmitter;
  accessing, via the identification check program, an identification data database comprising information identifying a plurality of wireless transmitters;
  during a time period in which an application associated with a financial service provider is not executing on the user device, determining, based on the information identifying the low energy wireless transmitter and the information identifying the plurality of wireless transmitters, that the low energy wireless transmitter is associated with the financial service provider;
  based on the determination, during the time period, that the low energy wireless transmitter is associated with the financial service provider, cause the application associated with the financial service provider (i) execute on the user device and (ii) transmit, to a server system associated with the financial service provider, a request for data relating to a user account associated with the financial service provider; and
  causing, via a display of the user device, presentation of the requested data received from the server system.

13. The one or more non-transitory computer readable media of claim 12, wherein causing the application to transmit the request comprises transmitting, via the application associated with the financial service provider, to the server system, an inquiry for account data of the user account associated with the financial service provider.

14. The one or more non-transitory computer readable media of claim 12, wherein the request comprises at least one of an identifier for the user device, or identification information of a user associated with the user device.

15. The one or more non-transitory computer readable media of claim 12, wherein the requested data comprises at least one of a push notification, a text message, or an e-mail.

16. A computer-implemented method comprising:
  receiving, via a low energy wireless transmitter, an identification signal;
  determining, via an identification check program executing on a user device, based on the identification signal, information identifying the low energy wireless transmitter;
  accessing, via the identification check program, an identification data database comprising information identifying a plurality of wireless transmitters;
  during a time period in which an application associated with a financial service provider is not executing on the user device, determining, based on the information identifying the low energy wireless transmitter and the information identifying the plurality of wireless transmitters, that the low energy wireless transmitter is associated with the financial service provider;
  based on the determination, during the time period, that the low energy wireless transmitter is associated with the financial service provider, cause the application associated with the financial service provider to (i) execute on the user device and (ii) transmit, to a server system associated with the financial service provider, a request for data relating to a user account associated with the financial service provider; and
  causing, via a display of the user device, presentation of the requested data received from the server system.

17. The method of claim 16, wherein causing the application to transmit the request comprises transmitting, via the application associated with the financial service provider, to the server system, an inquiry for account data of the user account associated with the financial service provider.

18. The method of claim 16, wherein the request comprises at least one of an identifier for the user device, or identification information of a user associated with the user device.

19. The method of claim 1, wherein the requested data comprises at least one of a push notification, a text message, or an e-mail.

20. The method of claim 16, wherein the low energy wireless transmitter comprises an ultra-low energy wireless transmitter.

* * * * *